United States Patent [19]
Green

[11] Patent Number: 4,811,803
[45] Date of Patent: Mar. 14, 1989

[54] DEER STAND

[76] Inventor: James Green, 5652 Post Rd., Cumming, Ga. 30130

[21] Appl. No.: 119,193

[22] Filed: Nov. 10, 1987

[51] Int. Cl.⁴ .................. B62D 63/00; A01M 31/02; A45F 3/26
[52] U.S. Cl. .................................. 180/7.5; 182/63; 182/142; 182/187
[58] Field of Search .............. 180/7.5, 7.1; 182/142, 182/136, 148, 127, 187, 63

[56] References Cited

U.S. PATENT DOCUMENTS

| | | | |
|---|---|---|---|
| 3,681,565 | 8/1972 | Fisher | 182/142 X |
| 4,602,698 | 7/1986 | Grant | 182/142 |
| 4,688,657 | 8/1988 | Erickson | 182/142 |

Primary Examiner—Charles A. Marmor
Assistant Examiner—Mitchell J. Hill
Attorney, Agent, or Firm—Hurt, Richardson, Garner, Todd & Cadenhead

[57] ABSTRACT

A wheeled, self-propelled deer stand for elevating hunters above the ground. The deer stand comprises a pivoted chassis the rear portion of which rotates to a vertical position when the structure is raised off the ground. The deer stand is motor-powered and has two pairs of bar and roller mechanisms for bracing the deer stand against a tree and providing stability when the deer stand is elevated. A winch and cable assembly is used to elevate the deer stand.

10 Claims, 2 Drawing Sheets

DEER STAND

BACKGROUND OF THE INVENTION

The advantages of hunting deer from an elevated position include a greater, unobstructed field of vision and increased safety resulting from being above the path of fire of hunters on the ground. Consequently, devices of various descriptions have been invented to provide these advantages to hunters. These devices include stands built in trees, chair lifts, and tree slings.

The following patents, U.S. Pat. Nos. 3,568,797; 3,731,762; 3,957,135; 4,347,913; 4,347,914; and 4,205,733 have taught the use of seats which are elevated by means of a cable attached to an overhead bough of a tree. In addition to being manually manipulated, they also have the disadvantage of being free-swinging. Thus a rifle recoil can cause the seat to swing sharply possibly jeopardizing the safety of the hunter.

Recent patents, U.S. Pat. Nos. 4,552,248 and 4,623,036 have taught the use of bicycle-like foot pedals and an electric motor, respectively, for activating a winch mechanism. Both of these patents are well-suited for workmen but inappropriate for hunters because of the aforementioned stability problem.

The most germane prior art to the present invention are three recent patents that disclose platform-like devices that do not have the instability problem of the chair lift devices. U.S. Pat. Nos. 4,593,789 discloses a tree climbing platform that can be raised or lowered by a winch using foot-operated pedals and provides tree-trunk engaging means and a platform adapted to be raised or lowered over a tree trunk. U.S. Pat. No. 4,602,698 discloses a hunting chair device that provides brackets to brace the chair against a tree, foot pedals attached to a reel for elevating the chair, and a foot rest to provide a stable elevated platform. Upper and lower spacers are attached to the device to maintain the chair in a stable relationship to the tree. U.S. Pat. No. 4,625,831 discloses a ladder-like hunting stand mounted on the rack of an all-terrain vehicle. The platform has a V-shaped edge for resting against a tree trunk. In contrast to the other patented devices which rely on winch mechanisms, this patent discloses a ladder means that is easily extended or collapsed. The prior art does not disclose a wheeled vehicle with a pivoted chassis wherein the rear part of the chassis pivots to a vertical position to act as a counter weight for the horizontal platform portion of the chassis when the vehicle is winched up a tree.

SUMMARY OF THE INVENTION

The present invention is directed towards providing a deer stand that is highly portable and which provides the hunter with a stable, safe, and a comfortable platform for hunting game.

The deer stand of the present invention comprises a mobile, self-propelled, light weight, direct drive wheeled structure having a pivoted chassis the rear portion of which rotates to a vertical position when the structure is raised off the ground. The motor-powered deer stand is controlled by a steering wheel and steering lever operated by the hunter from a revolving driver's seat and includes two pairs of roller means for engaging the trunk of a tree in a bracing relationship. The upper pair of rollers is stationary; the lower pair is adjustable to the diameter of the tree. Each pair of rollers projects outwardly from the frame of the chassis to from a V-shaped angle. A removable platform is positioned above the driver seat for the hunter's use after the structure is elevated. The platform is fixed to the forward part of the chassis and is raised by a manually or electrically operated winch and cable assembly. The free end of the cable is attached to a double belt which is physically carried up the tree and secured around the trunk or appropriately-sized limb.

Therefore, it is an object of the present invention to provide a self-propelled deer hunting stand that can be driven right up to the trunk of the tree to be used by the hunter.

It is a further object of this invention to provide a platform for hunting that is very stable and not subject to swaying as a consequence of rifle recoil or normal environmental factors.

DETAILED DESCRIPTION OF THE INVENTION

Figure 1:
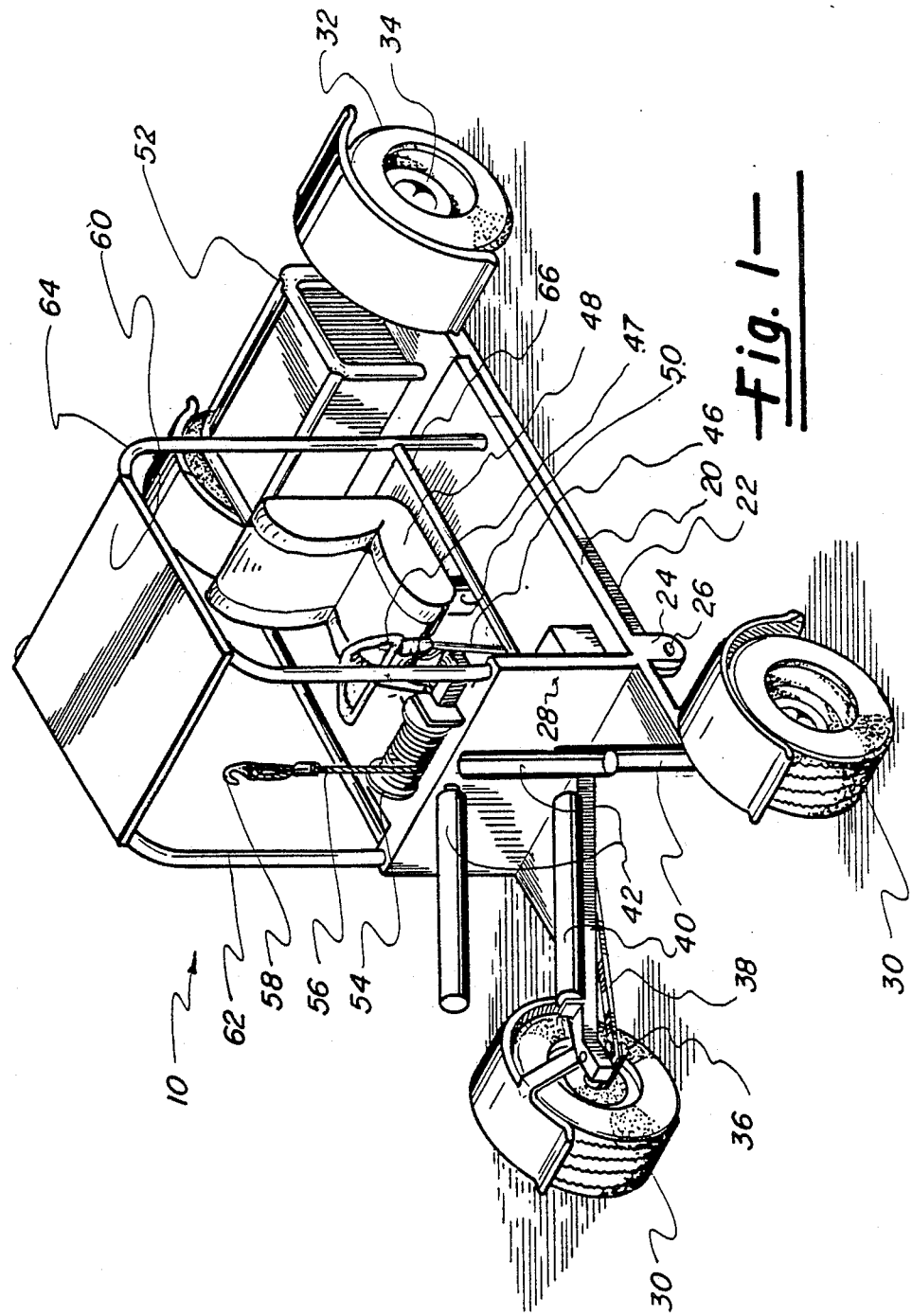
FIG. 1 is a perspective view of the deer stand of the present invention and shows the vehicle in its driving configuration on the ground.

With reference now to FIG. 1, the deer stand 10 consists of upper chassis plate 20 welded to upright front frame 28 and hingedly connected to lower chassis plate 22 by hinge 24 and bolt 26. The upper and lower chassis plates 20 and 22 respectively, and the upright front frame 28 are fabricated from aluminum to keep the frame of the deer stand light in weight and make it easy to lift off the ground. Fixed to the chassis are four tires 30 and 32. The rear tires 32 are mounted on rear axle 34. Each forward tire 30 is mounted on short axle 36 which is connected to upper chassis plate 20 by link 38. Mounted to upright frame 28 are upper pair of stationary bars and rollers 42 and lower pair of adjustable bars and rollers 40. As depicted in FIG. 1, both upper and lower rollers 42 and 40 respectively, are disposed in a plane perpendicular to upright frame 28 at an acute angle so as to form a V shape with respect to the frame. The upper rollers 42 are used to brace the deer stand against a tree. The lower rollers 40 are adjustable to the diameter of the tree trunk up to a maximum angle equal to that formed by fixed links 38.

Forward compartment 44 is fixed to upper chassis plate 20 and contains a battery and fuel tank (not shown). The battery is used to electrically power a motor to drive the winch 54 and cable 56. At the free end of the cable 56 there is disposed hook 58. The winch and cable assembly is mounted on a plate welded to the top of said upright frame 28 and is used to physically lift the deer stand 10 off the ground. Welded to the rear of the lower chassis plate 22 is rear compartment 52 which houses the motor (not shown) used to propel the deer stand across the ground. The hunter sits on chair 48 which has a base fixed to vertical support 50 so that it is free to rotate 360 degrees. The vertical support is fixed to upper chassis plate 20. Steering of the deer stand is controlled by steering wheel 47 and steering level 46 which causes the deer stand to move in either a forward or reverse direction.

Platform means comprising platform 60 and platform support bars 62, 64 provide a stable horizontal surface to support the hunter when the deer stand is elevated above the ground.

Welded to the top of upright frame 28 are forward platform support bars 62. Welded to the rear part of upper chassis 20 are rear platform support bars 64. The upper portion of the two pairs of platform support bars are curved and transform into a flat section parallel to upper chassis plate 20. Fixed to this flat section is platform 60 which provides the hunter a flat seat to sit upon while he monitors the selected area within his field of vision for game. Horizontal bars 66 are fixed between forward platform support bars 62 and rear platform support bars 64 to provide safety for the driver when moving the deer stand 10 and serve as a step up to the platform 60.

Figure 2:
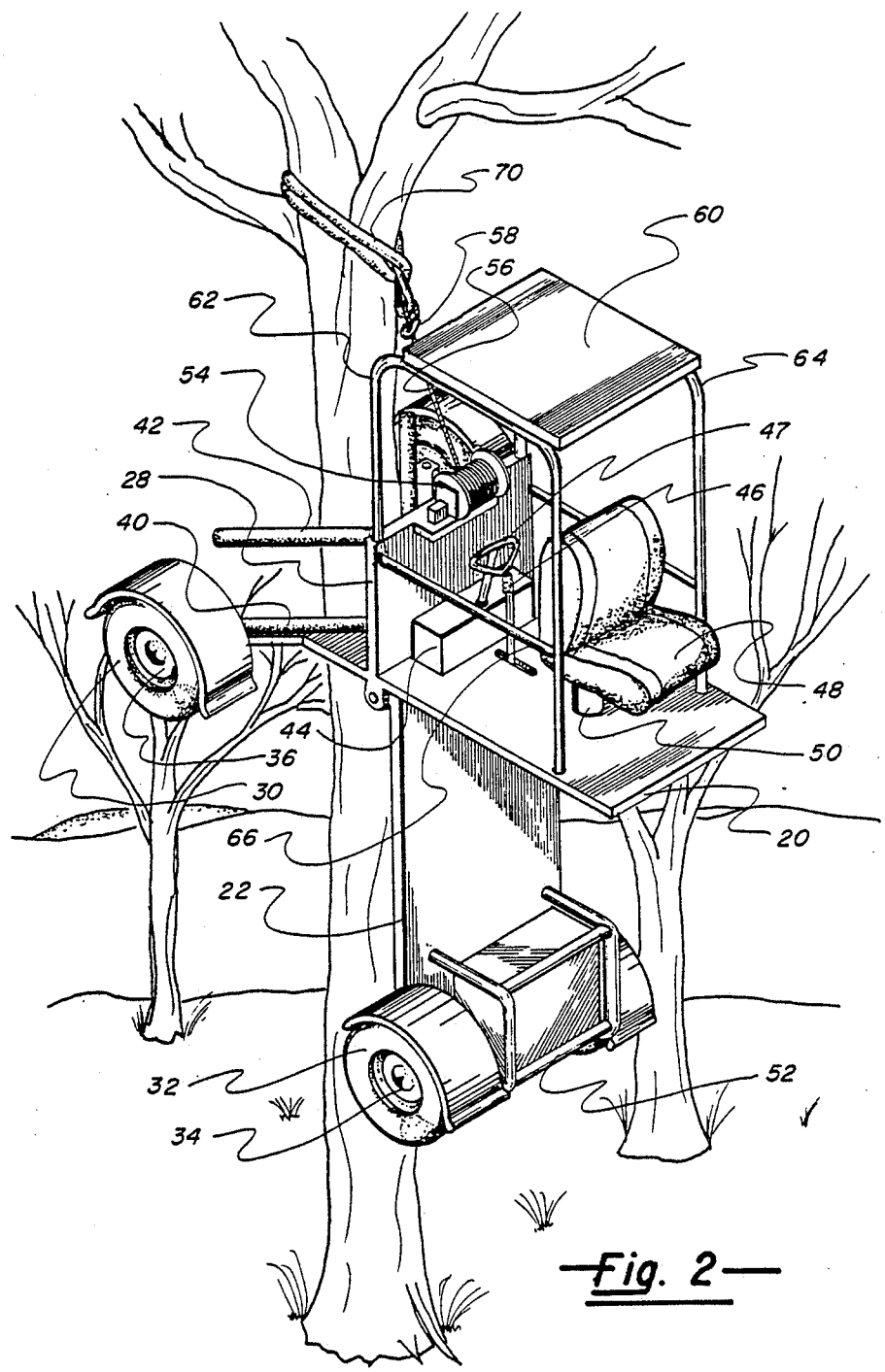
FIG. 2 is a perspective view of the deer stand in operation extended above the ground with the cable engaged and the lower chassis plate pivoted downward.

In operation, the hunter transports the deer stand 10 to the vicinity in which he wishes to hunt. He then drives the deer stand 10 up to the selected tree. FIG. 2 shows the deer stand in actual use for hunting. The hunter climbs the tree and attaches double loop belt 70 around the trunk or a limb strong enough to support the weight of the deer stand 10 at an appropriate height above the ground. He then attaches hook 58 to belt 70. The winch is manually or electrically operated to retract the extended cable 56 and thus raise platform 60 to the desired height above the ground.

As the cable is retracted around the reel of the winch 54, the hingedly pivoted lower chassis frame 22 rotates downward under the force of gravity as shown to provide an effective counterbalance thus increasing the stability of suspended platform 60 as it is raised.

I claim:

1. A deer stand for elevating hunters above the ground comprising:
   an upper chassis plate;
   a lower chassis plate hingedly connected to said upper chassis plate;
   an upright front frame mounted on said upper chassis plate;
   a seat rotatably attached to said upper chassis plate;
   a plurality of platform support bars having a horizontal upper portion, a forward vertical portion fixedly mounted to the top of said upright front frame, and a rear vertical portion fixedly mounted to said upper chassis plate;
   a platform mounted on the flat upper portion of said platform support bars;
   wheel and axle means having a pair of front wheels mounted on separate short axles and a pair of rear wheels mounted on a long axle secured to said lower chassis plate;
   link means to secure said front axles to said upper chassis plate;
   a plurality of bar and roller assemblies mounted at an acute angle with respect to said upright front frame;
   a winch and cable assembly means for raising said deer stand off the ground;
   said winch and cable assembly means comprising a winch and a cable;
   hook means attached to the free end of said cable;
   belt means for securing said hook means to a tree;
   motor means to enable said deer stand to be propelled over the ground; and
   steering means to control the direction of movement of the deer stand.

2. The deer stand of claim 1 in which said bar and roller assemblies further comprises:
   an upper pair that is stationary and braces the front of said deer stand against a tree;
   a lower pair that is adjustable and can accomodate the circumference of most trees.

3. The deer stand of claim 1 in which said motor means are mounted in a compartment welded to the lower chassis plate and which provides a counterbalance weight for stability of said platform when elevated.

4. The deer stand of claim in in which said lower chassis plate rotates to a vertical position as the deer stand is lifted off the ground.

5. The deer stand of claim 1 in which said cable is retracted when said winch is operated to raise said deer stand.

6. The deer stand of claim 1 in which said belt means comprises a double loop belt.

7. A motor-powered deer stand for elevating hunters above the ground comprising:
   an upper chassis plate;
   a lower chassis plate hingedly connected to said upper chassis plate;
   front wheel and axle means in which said front wheel and axle means are independently mounted to said upper chassis plate;
   rear wheel and axle means in which said rear wheel and axle means is mounted on said lower chassis plate and is connected to both rear wheels;
   bracing means for engaging the deer stand in a support relationship against a tree;
   lifting means for raising said deer stand off the ground; and
   platform means for support of the hunter when said deer stand is off the ground.

8. The deer stand of claim 7 in which the bracing means further comprises:
   an upper pair of stationary bars and rollers mounted to said upright front frame to brace said deer stand against the tree;
   a lower pair of adjustable bars and rollers mounted to said upright front frame to brace said deer stand against the tree and maintain tangential contact with the trunk of the tree.

9. The deer stand of claim 7 in which the lifting means further comprises:
   a winch and cable assembly means for elevating said deer stand;
   said winch and cable assembly means comprising a winch and a cable;
   hook means attached to the free end of said cable;
   belt means for securing said hook means to a tree.

10. The deer stand of claim 7 in which the platform means further comprises:
    a plurality of platform support bars having a horizontal upper portion for seating the platform a forward vertical portion mounted to the top of said upright front frame, and a rear vertical portion mounted to the top of said upper chassis plate.

* * * * *